April 21, 1953        R. W. WOLFE        2,635,478
POWER TRANSMISSION
Filed Oct. 15, 1947        5 Sheets-Sheet 1
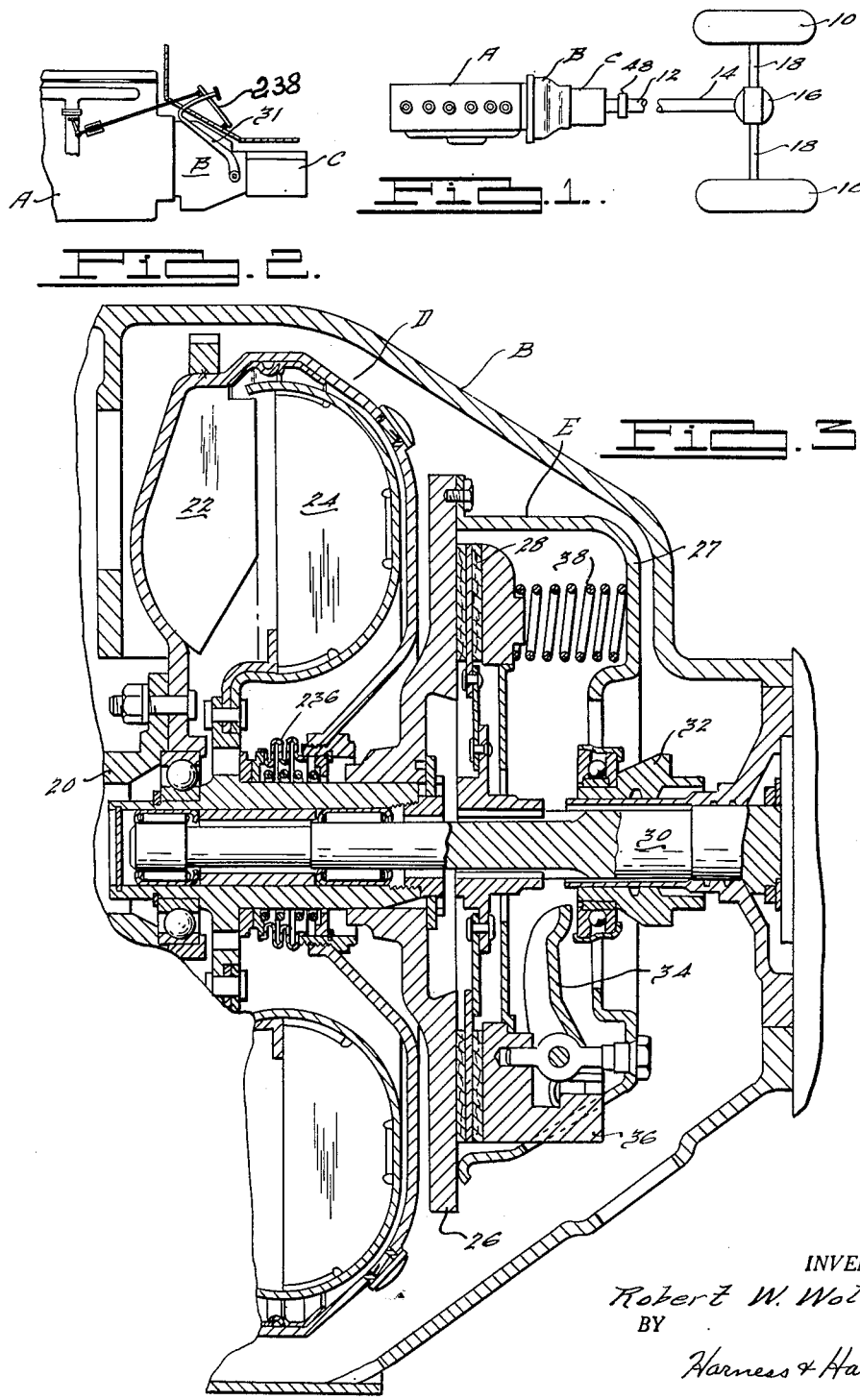
INVENTOR.
Robert W. Wolfe.
BY
Harness & Harris
ATTORNEYS.

INVENTOR.
Robert W. Wolfe.
BY
Harness & Harris
ATTORNEYS.

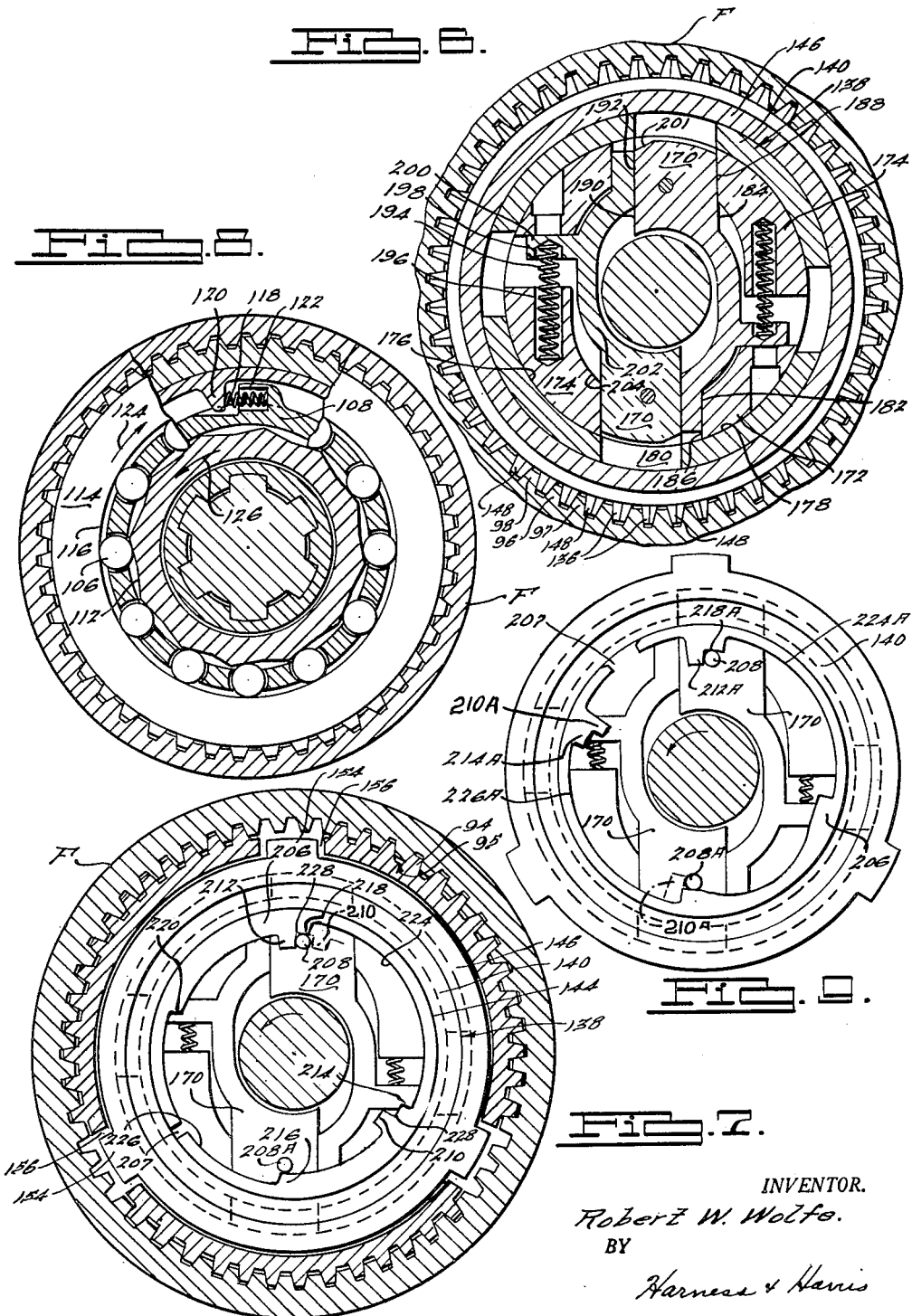

INVENTOR.
Robert W. Wolfe.
BY
Harness & Harris
ATTORNEYS.

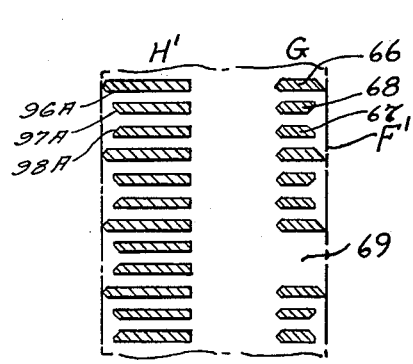
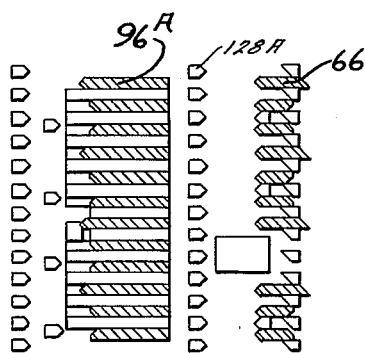
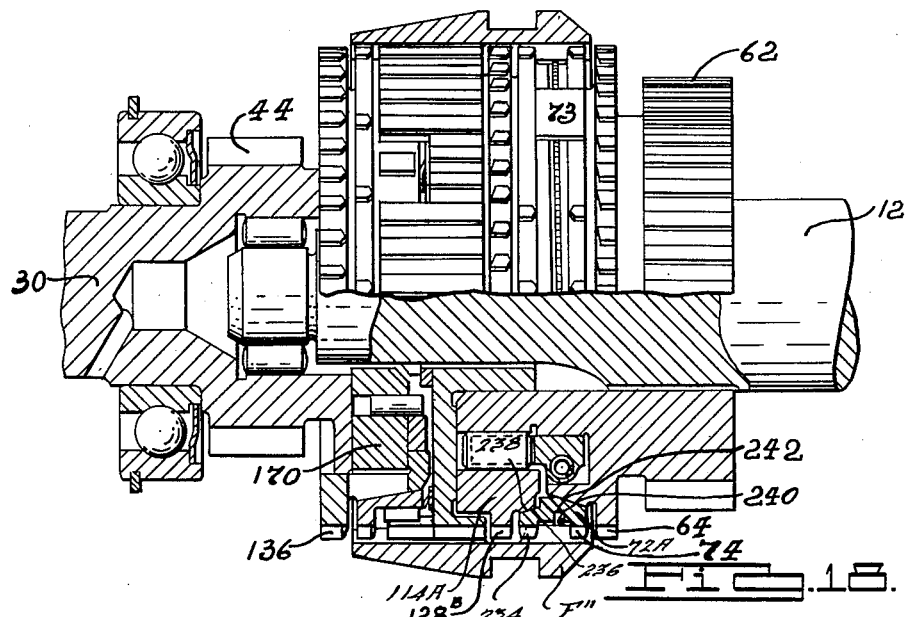
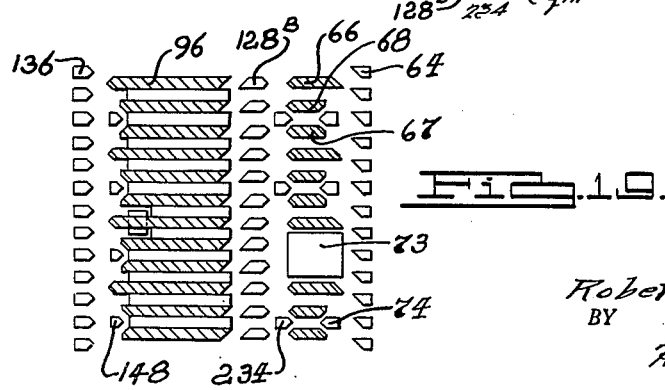

Patented Apr. 21, 1953

2,635,478

UNITED STATES PATENT OFFICE 2,635,478

POWER TRANSMISSION

Robert W. Wolfe, Royal Oak, Mich., assignor to Chrysler Corporation, Highland Park, Mich., a corporation of Delaware Application October 15, 1947, Serial No. 780,011

32 Claims. (Cl. 74—336)

This invention relates to power transmissions, particularly to improvements in semi-automatic transmissions of the character disclosed, for example, in the copending application of Otto E. Fishburn, Serial No. 655,193, filed March 18, 1946, now Patent No. 2,571,434, dated October 16, 1951, providing three-speed forward and reverse drives wherein a centrifugal type pawl clutch is employed to provide a change from a slower to a faster speed ratio drive on engine deceleration at or above a predetermined vehicle speed in the slower drive, and wherein, the transmission receives its drive from the engine through a fluid power-transmitting device.

In the said Fishburn transmission the centrifugal pawls of the clutch may ratchet and rub against the pawl-receiving shell while the transmission is established in any speed ratio drive slower than direct drive. This condition is conducive to considerable noise and also to wear of the clutch parts. Moreover, the clutch pawls are locked out of engagement when the transmission is established in its slower speed ratio drive, for example, two-way second speed ratio drive. Consequently, if the vehicle is going down hill and the main clutch of the vehicle be disengaged in preparation for an upshift in the transmission from this drive to a faster speed ratio drive, for example, two-way direct drive, it would be difficult to effect engagement of the pawls unless the pawl shell be unblocked to receive them before the pawl carrier rotative speed had dropped below that of the pawl shell. This, however, will not always occur. The differential speeds of the pawl carrier and shell in this situation, also cause ratcheting, and attempts to effect engagement of the pawls by speeding up the engine and consequently, increasing the speed of the pawl core or carrier to that of the pawl shell after re-engagement of the main clutch could result in damage to both engine and transmission. In addition, shifts between two-way second speed ratio drive position and direct drive position involve considerable dead movement of the clutch shift sleeve and short piloting of the sleeve is a consequence.

It is the object of the present invention to provide improvements in transmissions of the aforesaid character and among other things, provide new and/or additional features overcoming the problems enumerated above.

Thus, it is an object of my invention to provide means for inhibiting rubbing and ratcheting of the centrifugal pawls of the clutch during asynchronous rotation of the pawl carrier and shell.

A further object is to provide means for blocking engagement of the centrifugal pawls at asynchronous speeds of the pawl carrier and shell under both drive torque and coast torque operating conditions to thereby prevent damage to the engine and transmission when, for example as aforesaid, the engine be speeded up to engage the pawls when the vehicle is coasting above engine speed.

Another object is to provide a balk ring construction for the centrifugal pawls featuring a single driving lug which is also so arranged and constructed as to apply drive to the ring with minimum energization thereof.

An additional object is to provide a balk ring as aforesaid adapted to allow engagement of the centrifugal pawls upon torque reversal from a position where the pawls while undergoing drive are just short of alignment with the pawl windows.

A still further object is to provide a floating pawl-receiving shell adapted to be maintained in engagement with the pawls during operation of the transmission in two-way second speed ratio drive following a downshift thereto from a faster speed ratio drive and so long as the speed of the pawl carrier is above the pawl engaging speed.

An additional object is to provide in an automotive vehicle a clutching mechanism having a synchronized shift from neutral to free wheel drive position of the clutch mechanism in starting the vehicle from rest.

A further object is to provide in an automotive vehicle a clutch mechanism including a free wheel device having a tooth element engageable with a shiftable clutching member, and means for synchronizing the relative rotative speeds of the element and member to facilitate shifting of said member without clashing.

Another object is to provide in an automotive clutch mechanism a novel arrangement of clutching teeth and blocking teeth on the shiftable member of the clutch mechanism, for example, the clutch sleeve, wherein the clutch teeth are conditioned for engagement with their mating clutching teeth of a predetermined speed ratio drive when the blocking teeth are in blocking position and which clutch teeth may immediately engage upon further movement of the clutch sleeve in an engaging direction following unblocking of the blocking teeth.

Still another object is to provide a novel arrangement of long and short teeth on the clutch sleeve of a clutching mechanism of the aforesaid character wherein the long teeth are set to enter into engagement with their mating clutch teeth with minimum lost motion of the sleeve when the short teeth are in blocking position.

A further object is to provide a tooth clutch mechanism for an automotive transmission having teeth pointing so constructed and arranged to prevent dead-ending of the teeth during movement of the shiftable clutching member to effect speed changes.

A still further object is to provide a clutch mechanism including a manual selector for operating the shiftable clutching member in which movement of the shiftable clutch member or sleeve between drive-establishing positions is minimized to reduce shifting effort at the selector.

Another object is to provide means for preventing lockup in a free wheel drive when shifting into a positive drive, for instance, in making shifts from free wheel second speed ratio drive into two-way second speed ratio drive.

An additional object is to provide a shiftable member of a transmission clutch mechanism with teeth suitably pointed to effect operation of the free wheel device in a releasing direction for facilitating shifts between a free wheel drive position and a positive drive position, for example, between free wheel second drive ratio position and two-way second drive position of the shiftable member.

A specific object of my invention is to provide a clutch construction having longer piloting teeth on the clutch teeth sleeve for facilitating smoother up and down speed ratio drive changes.

These and other objects of my invention will become apparent from the following description when taken in conjunction with the accompanying drawings wherein:

Fig. 1 is a diagrammatic showing of the power plant drive mechanism of a vehicle incorporating the present invention, Fig. 2 is a side elevational view of the power plant and transmission;

Fig. 3 is an enlarged cross sectional view of a portion of the mechanism of Fig. 1;

Fig. 6 is a sectional view taken at 6—6 of Fig. 5 showing the centrifugal pawl clutch mechanism with the pawls disengaged from the pawl shell;

Fig. 7 is a sectional view taken at 7—7 of Fig. 5 showing the friction energized balk ring of my invention for preventing engagement of the pawls of the centrifugal pawl clutch during asynchronous rotation of the pawl carrier and shell, the pawls being shown in disengaged position and the shell slots being shown in dotted lines;

Fig. 8 is a cross-sectional view taken at line 8—8 of Fig. 5 through the freewheel roller clutch mechanism of my invention, parts being broken away to show the means for resiliently urging the roller carrier to effect drive between the inner and outer elements of the freewheel device;

Fig. 9 is a view similar to that of Fig. 7 showing a modified form of balk ring of my invention subject to minimum energization;

Fig. 16 is a view similar to that in Fig. 10 of some of the teeth of the clutch sleeve of Fig. 5 with the forward teeth modified to clear the free-wheel outer race teeth in two-way second ratio drive position of the sleeve;

Fig. 17 is a view similar to that of Fig. 15 showing the clutch sleeve of Fig. 16 in two-way second position, this view also showing a modification of the freewheel clutch teeth;

Fig. 18 is an enlarged view similar to that in Fig. 5 of a modification embodying a double synchronizer; and Fig. 19 is a development taken similar to that of Fig. 11 of the interengageable teeth of the Fig. 18 structure.

Figure 4:
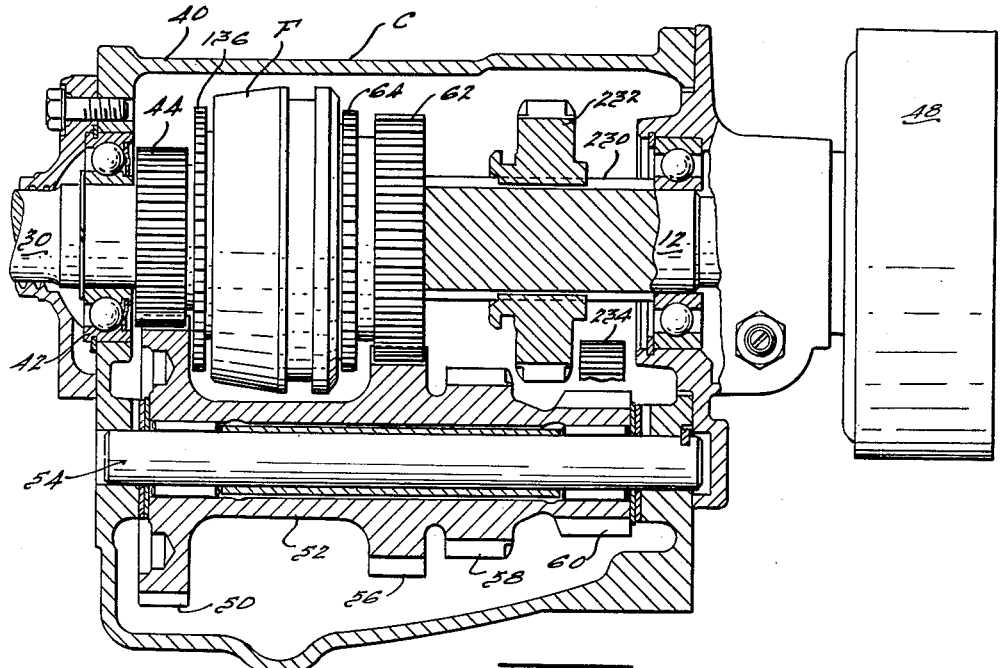
Fig. 4 is an elevational view partly in section of the change speed transmission of my invention and which drivingly connects with the mechanism of Fig. 3.

Referring now to the drawings wherein similar reference characters are used to designate corresponding parts of the structure, Fig. 1 illustrates a typical arrangement of the transmission mechanism of the present invention in a vehicle embodying the same. The vehicle engine A is coupled to the driving wheels 10 of the vehicle through a fluid power-transmitting and main clutch unit B shown in greater particular in Fig. 3, and a change speed gearing C shown in detail in Figs. 4 and 5 through 19 inclusive, and comprising a three-speed forward and reverse transmission having under driver control an automatically operative direct drive ratio. As seen in Fig. 1, the output shaft 12 of the unit C is connected by means of the usual propeller shaft 14 with customary differential gear box 16 which in turn drives the axle shafts 18. A 3.9 axle ratio is preferred.

As best seen in Fig. 3, I preferably arrange for transmitting drive from the engine A to the transmission C through clutch means comprising a fluid power-transmitting device such as the fluid coupling D of the kinetic type preferably in conjunction with a releasable main clutch E of conventional design to facilitate manual shifts of the clutch sleeve F in the transmission C.

The engine crankshaft 20 (Fig. 3) drives the coupling impeller 22 to circulate fluid in its vaned passages to drive the vaned runner 24 in a manner well known for fluid couplings of the type illustrated. The runner 24 drives the input member or driving plate 26 of the main clutch E which, as illustrated, is of the friction type. As shown, the driving plate 26 is drivingly connected with the runner 24 and to a clutch housing member 27. The driven member or mat 28 of the friction clutch E is fixed to the intermediate shaft 30 and is drivingly disengaged by depressing a clutch pedal 31 which slides the throwout 32, forwardly to operate lever 34 to unload the pressure driving plate 36, springs 38 loading this plate and engaging the clutch when the clutch pedal 31 is released.

The shaft 30 extends rearwardly into the housing or casing 40 of the transmission C (Fig. 3) where it is rotatably supported by a ball bearing 42 and is formed with a main drive pinion 44 at its inner end. Also formed on the inner end of the shaft 30 is an enlargement 45 constituting the pawl carrier or core of a centrifugal clutch, more clearly illustrated in Fig. 5. The drive pinion 44 is hollow and journals by a bearing 46 (Fig. 5) the forward end of the transmission driven shaft 12 which may also carry at its opposite end a propeller shaft brake drum 48 having braking mechanism (not shown) associated therewith.

The drive pinion 44 is in constant mesh with a gear 50 for driving the countershaft cluster 52 carried for rotation on a countershaft 54 supported in the casing 40. The cluster 52 includes a second or intermediate speed pinion 56, a first or low speed pinion 58, and a reverse drive pinion 60.

Figure 5:
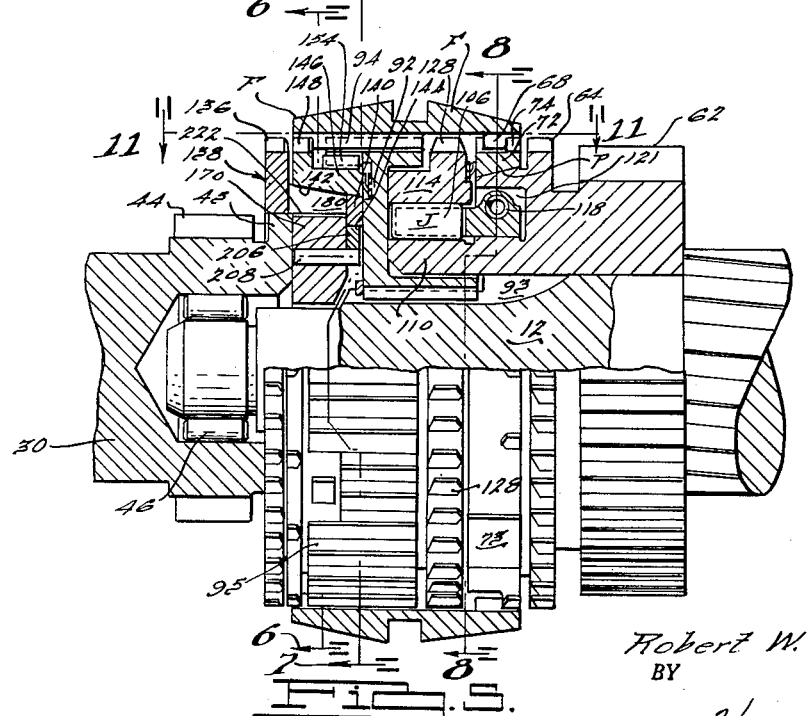
Fig. 5 is a detailed enlarged view of the second-direct clutch mechanism of Fig. 4, the shiftable clutch sleeve being shown in neutral position and the centrifugal clutch pawls being shown disengaged.

The second speed pinion constantly meshes with a second speed gear 62 journaled for rotation on the shaft 12, as seen in Fig. 5. This gear has a set of integral external clutch teeth 64 adapted for interengagement with a group of internal clutch teeth generally designated by the letter "G" in Fig. 10 of a manually shiftable clutch member F which is adapted to be shifted axially of the shaft 12 to various positions by a shift yoke and rail mechanism, not shown, under control of the vehicle driver suitable stops or detents being provided to properly locate the sleeve in any given position.

Figure 11:
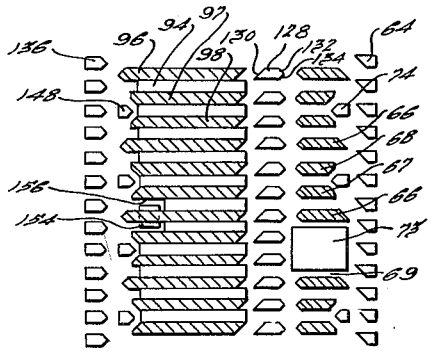
Fig. 11 is a sectional development of some of the interengageable teeth of the Fig. 5 clutch taken on line 11—11 in Fig. 5, the clutch sleeve being shown in neutral position.
Figure 15:
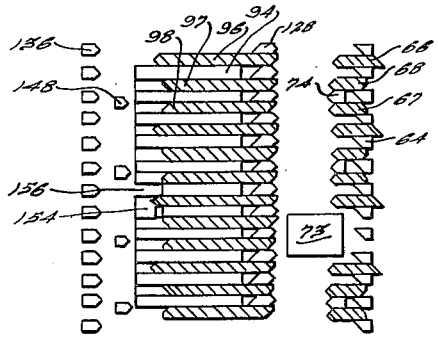
Fig. 15 is a similar view showing the teeth of the clutch sleeve engaged in two-way second speed drive position.

Engagement with the teeth 64 is effected by rearward movement of the sleeve from its neutral position in Figs. 5 and 11 to that of Fig. 15 which is the non-freewheeling or two-way second speed position of the sleeve and establishes a drive through the elements 39, 44, 50, 56, 62, F, 92, 12.

Figure 10:
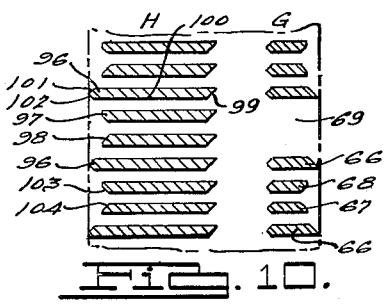
Fig. 10 is a sectional development of the teeth of a portion of the clutch shift sleeve of Fig. 5 taken in line 11—11 in Fig. 5, the ends of the sleeve being illustrated by dot-dash lines.

As seen in Figs. 10 and 11 the tooth group G comprises individual relatively long teeth 66 spaced apart circumferentially by sets of two relatively short teeth 67, 68 certain of these sets being omitted to provide spaces as at 69, Fig. 10, and the rearward ends being set back axially from the rearward ends of the teeth 66 all for purposes hereinafter to be described.

Figure 14:
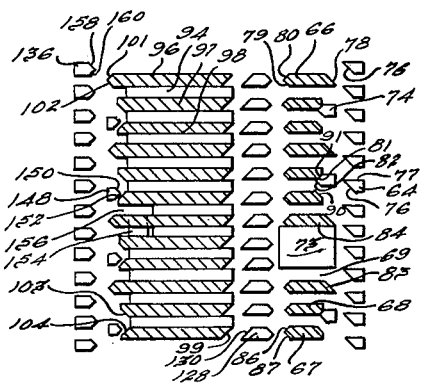
Fig. 14 is a similar view showing the clutch sleeve teeth in blocked position during shift from direct drive position to two-way second speed ratio drive position.

The gear member 62 is also provided with a cone-shaped surface P on which is rotatably carried a synchronizing and blocker element or ring 72, having clutch blocker synchronizing teeth 74 (see Figs. 5 and 14) which are engageable by the teeth 67, 68 of the clutch sleeve F, as seen in Fig. 14, for blocking rearward shift of the clutch sleeve when the relative rotative speeds of the sleeve and gear 62 are asynchronous. It will be noted that a set of teeth 67, 68 straddle each blocker tooth 74 and this relationship is maintained by an upstanding radial clocking lug 73 which oscillates in the space 69 of the shift sleeve F. The forward ends of the teeth 64 are sharply pointed, their end faces 76 (Fig. 14) intersecting the side faces 77 of these teeth at an acute angle of approximately 36°. The rearward ends of the long teeth 66 are sharply pointed in a manner similar to the clutch teeth 64 and complementary thereto so that as seen, the faces 78 of the teeth 66 are parallel to the faces 76 of the teeth 64. Furthermore, the forward ends of the teeth 66 of the clutch sleeve are formed by converging faces 79, 80 forming an included angle preferably an angle of approximately 110°, for example. The forward ends of the blocker teeth 74 are shaped similar to the forward ends of the teeth 66 providing the converging tips with faces 81 and 82. The rearward ends of the teeth 74 as well as the rearward ends of the clutching teeth 64 are preferably formed square with the axis of rotation of the clutch mechanism. The teeth 67, 68 of the clutch sleeve are somewhat shorter than the teeth 66 which may be said to be long teeth for reasons hereinafter set forth.

As previously indicated, a long tooth 66 is provided after each set of two short teeth 67, 68 circumferentially of the clutch sleeve and certain of the short teeth are omitted between two long teeth 83, 84 to provide a clocking slot 69 for receiving the radially projecting lug 73 of the blocker ring 72 and permits the latter to oscillate within the limits of the slot 69 to provide relative rotation with the clutch sleeve F such that when the lug 73 is at either limit of the slot 69 the teeth 67 or 68 will be in blocking relation to the teeth 74 of the ring 72 upon rearward movement of the sleeve F. As soon as the rotative speeds of the sleeve and gear 64 become synchronized, the teeth 67, 68 will be enabled to pass by the blocker teeth 74. Although only one lug 73 and slot 69 are illustrated, a plurality may be provided preferably equally spaced circumferentially. In the instant disclosure, three such lugs and slots are preferred.

As seen in Fig. 14, the short teeth 67, 68 of the clutch sleeve have their forward ends pointed similar to the long teeth 66 thereof to provide the end operating faces 86 and 87 respectively. Moreover, the rear ends of these teeth 67, 68 are blunted including an angular face and a square end face. Thus the teeth 67 have an angular face 90 paralleling the face 82 of the blocker teeth 74 and the teeth 68 have an angular face 91 paralleling the face 81 of the blocker teeth 74.

The clutch sleeve F is slidably carried on a toothed hub member 92 splined to the shaft 12 at 93. The hub 92 has external splines or teeth 94 (Figs. 5 and 14) having square ends, these teeth being spaced circumferentially to provide splineways 95 (Fig. 5), to receive the internal teeth generally designated by the letter H (Fig. 10) of the shift sleeve and comprising individual long teeth 96 spaced circumferentially by a set of intervening short teeth 97, 98, the forward ends of which are set back axially from the teeth 96 for a purpose to be described. The teeth 96, 97, 98 respectively, have their rearward ends pointed by chamfered faces 99 extending at an acute angle relative to the axis of rotation in a manner similar to the teeth 66 but complementary thereto, that is, the faces 99 have a rearward upward slope whereas the faces 78 of the teeth 66 slope downwardly, rearwardly. The long teeth 96 have their forward ends pointed in a manner similar to the forward ends of the teeth 66 to provide the angular faces 101 and 102 while the forward ends of the teeth 97, 98 respectively, are formed similar to the rearward ends of the teeth 67, 68 of the group G providing the faces 103, 104 respectively. It will be observed that the teeth 96, 97 and 98 of group H are respectively axially aligned with the teeth 66, 68 and 67 respectively of the group G.

An overrunning clutch generally designated by the letter J (Fig. 5) is arranged drivingly intermediate to the gear member 62 and clutch sleeve F carried by the hub 92 and adapted to selectively drivingly be connected to the sleeve F to provide a one-way driving connection between the gear 62 and hub 92 through the clutch sleeve F, the clutch J being adapted to drivingly lock the gear 62 and sleeve F together upon tendency of the gear 62 to rotate faster than the sleeve F in a forward direction, that is, clockwise looking rearwardly of Fig. 4, while permitting overrun of the clutch sleeve F relative to the gear 62 upon tendency of the clutch sleeve F to rotate faster than the gear 62.

The clutch J is of the conventional roller type and is provided with rollers 106 (Fig. 8) and a cage or carrier 108 having a resilient driving connection with the gear 62. The forward portion 110 of the gear 62 is provided with cam surfaces 112 and forms the inner race of the device J. An outer ring or shell 114 surrounds the rollers 106 and provides a smooth runway 116 therefor. A compression spring 118 having one end seated against a lug 120 in the undercut portion 121 of the gear 62 and its other end seated in a recess 122 of the cage 108, biases the rollers in the direction of the arrow 124 in Fig. 8, into lockup position such that lockup occurs whenever the gear 62 tends to rotate forwardly in the direction of the arrow 126 in Fig. 8, faster than the shell 114.

The outer ring or race 114 of the freewheel device is provided with short external teeth 128 (Figs. 5, 11, and 14) engageable with the sets of teeth G and H of the clutch sleeve F in the manner hereinafter described. It will be observed that the forward ends of the teeth 128 are sharply pointed in a manner complementary to the rearward ends of the teeth 96, for example, to provide the end faces 130; also that the rearward ends of the teeth 128 are provided with converging pointed ends similar to the ends of the teeth 74 to provide the faces 132, 134 respectively.

In the neutral position of the clutch sleeve F, as seen in Figs. 5 and 11, the clutch sleeve teeth are entirely disengaged from the teeth 128 of the outer race of the freewheel device J, and from all other teeth of the clutching mechanism except that the teeth of the group H are engaged with the splines 94 of the hub 92.

Figure 13:
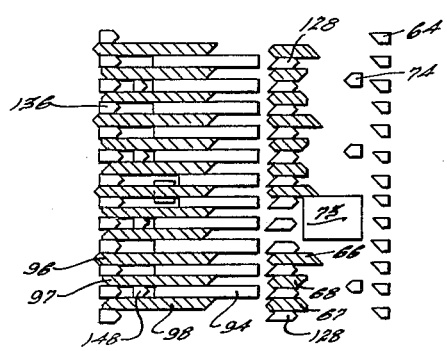
Fig. 13 is a similar view showing the clutch sleeve teeth engaged in direct drive position.

The clutch sleeve F is also adapted to be manually shifted forwardly of the neutral position in Figs. 5 and 11 to that in Fig. 13 to engage the teeth of the group G of the sleeve F with the teeth 128 of the freewheel device J, and thereby establish freewheel second speed ratio drive of approximately 1.68:1 between the input shaft 30 and the driven shaft 12 through the means comprising the elements 30, 44, 50, 56, 62, freewheel J, clutch sleeve F, hub 92, and shaft 12.

In the forward movement of the clutch sleeve F to establish freewheel second ratio drive, the internal teeth H of the clutch sleeve are engaged with a set of clutch teeth 136 of a floating pawl engaging shell or cage 138 which is journalled on the pawl carrier portion 45 of the drive pinion 44, this shell having a rearwardly extending hub portion 140 provided with an external conical friction face 142 and a further internal friction face 144. A blocker synchronizer ring 146 is rotatably supported on the conical face 142 of the shell 138 and has blocker teeth 148 which are similar in form to the blocker teeth 74 of the ring 72 to provide the angular faces 150, 152. The ring 146 has an external radially directed lug 154, of which there are preferably three in number, equally spaced circumferentially of the member 146 and which project into slots 156 (Fig. 7) in the forward rim portion of the hub 92 to provide a lost motion connection therewith. Preferably, in forming the slot 156 portions of two of the hub splines 94 are also cut away to simplify manufacture. It will be noted that the teeth 136 of the pawl-receiving shell 138 are shaped at their rearward ends the same as the rearward ends of the teeth 128 of the freewheel device J to provide the faces 158 and 160 respectively.

The drive pinion 44, as described above, has a portion 45 which serves as the carrier for the pawls 170 of a centrifugal clutch of which the shell 138 is the driven portion. As seen in Figs. 5 and 6, the enlarged portion 45 of the drive pinion 44 is provided with pawl guides 172 and 174 which have arcuate faces 176, 178 serving to journal the overlying hub portion 140 of the pawl shell 138. Slidably mounted between portions 172, 174 are a pair of radially movable pawls 170 which are adapted for outward movement oppositely to one another to engage slots or windows 180 provided in the floating shell 138 to establish a two-way direct drive between the shafts 12 and 30 when the teeth H of the clutch sleeve F are engaged with the clutch teeth 136 of the shell. Preferably, a plurality of pawl-receiving windows are provided. The number of windows is also preferably a multiple of the number of pawls and in the present construction, four pawl-receiving windows having a 90 degree circumferential spacing are shown. Each of the pawls has faces 182, 184 on the tail and head portions thereof respectively in sliding engagement with faces 186, 188 respectively, of the portions 172, 174 respectively of the pawl carrier (see Fig. 6). The pawls 170 are oppositely disposed relative to one another so that the face 190 of the head portion of the pawl opposite to the face 184 thereof slidably engages the face 192 of the tail portion opposite the face 182 of the latter.

In order to keep the pawls disengaged as in Fig. 6, below a predetermined speed of rotation of the pawl carrier 45, a normal radially inwardly acting bias is applied to the pawls to oppose their centrifugal tendencies in the speed range in which disengagement is desired. For this purpose control or governor means comprising compression springs 194 are provided in recesses 196 of the carrier portions 174 and engage lateral wing portions 200 of the pawls 170, to urge the pawls inwardly. Adjustment of the engaging speed of the pawls may be made either by replacing the springs with new ones of different force values or by means of adjustment screws (not shown).

The pawl windows 180 are preferably arranged such that diametrically opposite windows will simultaneously register with the pawls 170 so as to receive the pawls under the conditions hereinafter described.

The pawls 170 are slightly rounded or ramped at their outer leading portions 201 to reduce any slight ratcheting during any relative rotation of the carrier 45 and the shell 138 when the pawls are free to engage. Outward pawl movement following engagement is limited by engagement of the yoke portion 202 thereof with the inner surface 204 of the portion 174 of the pawl carrier.

Suitable means preferably in the nature of a split blocker or balk ring 206 is provided for preventing or blocking engagement of the pawls during rotation above their engaging speeds under drive or coast torque operating conditions when the relative speed of the pawl shell 138 and the pawl carrier 45 are asynchonous.

As seen in Figs. 5, 7, and 9 the ring 206 is split by a circumferential slot as at 207 and has a slight outward spring effect so that its outer peripheral surface is a friction fit with a mating bore 144 of the shell 138. Consequently, under certain conditions hereinafter referred to, a friction drive in the same relative direction of rotation as the shell will be impressed upon the ring 206.

If desired, the ring 206 may be frictionally engaged with a bore not shown, similar to the bore 144, provided in the hub 92 and a similar result be obtained since the hub 92 is drivingly connected with the sleeve F when the latter is also in drive relation to the shell.

The right hand pawl 170 in Fig. 7 is provided with a pin 208 and the left hand pawl with a pin 208A. These pins are rigidly fixed in the side faces of the pawls and project rearwardly through the plane of the balk ring 206.

During asynchronous rotation of the pawls and shell these pins lie in the path of driving lugs 210, 212 which project radially inwardly of the ring 206 and are at the same radial distance as the pins 208, 208A when the pawls are disengaged. It will be observed that the driving lugs in Fig. 7 are located circumferentially more than 90° of arc from the slot 207 and preferably will be equidistant therefrom.

Internal peripheral lands 214 and 216 are located respectively, on the opposite circumferential sides of the driving lug 210. Similar lands 218 and 220 are located respectively on the opposite sides of the driving lug 212. All these lands are preferably equidistant from the axis of rotation. It will be observed that the lands 214, 218 are relatively speaking short.

The ring 206 is recessed between the lands 214, 218 to provide a further long circumferential recess and land 224 at a greater radius than the lands 214, 218. This recess is adapted to receive the pin 208 when the pawls are engaged and by preference has a circumferential length exceeding the angular distance between two adjacent pawl windows 180. In the present showing this length is at least 90° of arc plus the diameter of the pin 208 to allow the pawl to engage under all relative positions of pawl and pawl windows. A similar recess and land 226 is provided for the pin 208A, this recess and land being interrupted by the slot 207. The recess 224 also reduces the ring section to thereby increase its flexibility and reduce the amount of torque necessary to make the ring slip under operating conditions.

When the pawls are in disengaged position the pin 208 will become engaged with one of the driving lugs 210, 212 depending upon whether drive torque or coast torque conditions prevail in the transmission. Thus if the vehicle is being driven in freewheel second speed drive the pawls will be rotating faster than the shell 138 (which is then being driven with the hub 92 through sleeve F) and the friction drag of the shell upon the balk ring will retard forward rotation of the ring with the pawl carrier 45 until the pin 208 engages the driving lug 212 following which the balk ring will be driving through the lug 212 by the pawl pin 208. The position of the pins 208, 208A will then be as seen in the full lines in Fig. 7. If the pawl carrier be decelerated while the pawls are above engaging speed, such that the speeds of the shell and carrier cross each other the balk ring will then tend to rotate with the shell 138 by reason of the friction drive connection therewith and relative rotation will occur between the lug 212 and pin 208 in a direction causing the lug to now lead the pin. The pin 208 will slide off the land 218 and as soon as the pawl becomes aligned radially with a shell window the pawl 208 will engage and the pin will fully enter the recess 224. In a similar manner the pawl pin 208A will slide off the land 216 and enter the recess 226 when its pawl engages. With the pawls engaged a drive will be established directly between the drive gear 44 and driven shaft 12 through pawls 170, shell 138, sleeve F, and hub 92.

Under coast torque conditions in freewheel second speed drive the shaft 12 will become the driver and the tendency will be for the balk ring 206 to rotatably lead the pawl carrier 45 such that the driving lug 210 will now engage the pawl pin 208 and the balk ring will slip relative to the shell 138. The pins 208 and 208A will assume positions relative to the lug 210 as shown by the dotted line showing of the lug 210 in Fig. 7. Upon speeding up of the pawl carrier such that torque reversal occurs, or stated otherwise, the relative speeds of the carrier and shell become synchronized and cross each other, the pawl pins 208, 208A will rotatably lead the balk ring and the pins will slide off the lands 214, 220 respectively, and enter the recesses 224, 226 respectively, when the pawls enter the shell windows 180.

So long as the pawl pins 208, 208A are engaged with the lands 214, 220 or 216, 218 of the balk ring, the pawls will be blocked from engagement and will be held in such relationship radially with respect to the inner peripheral surface 222 of the pawl shell that the outer radial ends of the pawls will not ride on the surface 222. Hence ratcheting of the pawls and consequent wear will be avoided.

When the speed of the pawl carrier drops below the pawl engaging speed such that the pawls are released from engagement with the pawl windows, the pawl pins 208, 208A will again assume one of the positions relative to the balk ring driving lugs 210, 212 described above.

It will be observed that in the described structure, only the pawl pins 208 are in engagement with a driving lug at any time, the pin 208A of the second pawl being adjacent a land which is free of any driving lug. The use of a single driving lug prevents undue energization of the balk ring during asynchronous rotation of the pawl shell and carrier. Moreover, it will be noted that the lug in driven relationship to the pawl pin is always the lug then nearest the ring slot 207 and therefore the side of the lug in contact with the pawl pin will be that side thereof furthest from the slot. Hence, the driving effort of the pin 208 is toward the ring slot 207 and the tendency is for a greater part of the ring to resiliently release its frictional engagement with the shell 138 and thus reduce wear and servo action. Furthermore, the radius of the corners 228 formed between the driving face of the lug 210 and the land 214 and between the driving face of the lug 212 and the land 216 is less than the radius of the pawl pins to thereby avoid a camming action between the balk ring and pawl pins with consequent tendency to over-energize the balk ring. As noted above, the recess 224 preferably extends over an angular distance greater than the angular distance between the adjacent pawl windows 180. This assures engagement of the pawls with the first pawl window approaching the pawl upon reversal of the relative rotation between the pawl carrier and shell.

Rearwardly of the gear 62 the shaft 12 is provided with a spiral splined portion 230 on which is slidable a low-reverse gear 232, this member being shown in its neutral position in Fig. 4. The gear 232 may be shifted forwardly or rearwardly of its neutral position by conventional yoke and rail mechanism (not shown) under driver control. When shifted forwardly, the gear becomes engaged with the low speed gear 58 to establish the low or first speed ratio drive of approximately 2.57:1 between the shafts 30 and 12, the drive consisting of the elements 30, 44, 50, 232, 12. When shifted rearwardly, the gear 232 becomes engaged with an idler gear 234 that is constantly in mesh with the reverse gear 60 thus establishing reverse drive having a ratio of approximately 3.57:1 between the shafts 30 and 12 through the elements 44, 50, 60, 234, 232. It will be understood that when shifting the gear 232 the clutch sleeve F will be locked in neutral position.

*Operation*

In describing the operation of the transmission, let it be assumed that the clutch sleeve F and the low reverse gear 232 are both in neutral position, the main or friction clutch E engaged and the engine is idling at approximately 450 R. P. M. Under these conditions the impeller 22 of the fluid coupling D will rotate at engine speed. There will be very little slip in the coupling at this time due to the drag of the coupling seal 236 (Fig. 3) between the impeller and runner and the light load imposed on the coupling by the freewheel clutch J, pawl carrier 45, and countershaft parts. Therefore, the pawl carrier and pawls will rotate at a speed slightly under engine speed but not sufficiently high to effect centrifugal movement of the pawls against the bias of the control springs 194. In any event, the pawls will not overrun the pawl windows of the shell because outward movement of the pawls is stopped by the blocker ring 206. Moreover, there will be no drive between the gear 62 and the clutch sleeve F, since the clutch teeth 128 of the outer race 114 of the freewheel device J are disengaged from the sleeve teeth G as seen in Fig. 11, and are rotating freely relative thereto.

In order to obtain forward movement of the vehicle, the driver will release the main clutch E so as to permit shifting into one of the two second speed starting gear ratios or into low or reverse gear. If the driver desires to start in the automatic upshifting second speed gear he will shift the clutch sleeve F forwardly to the position shown in Fig. 13 during which movement the clutch sleeve teeth H will become engaged with the teeth 136 of the pawl shell 138 and the teeth G of the clutch sleeve will become engaged with the teeth 128 of the outer race of the freewheel device J to drivingly connect the latter with the sleeve F, the drag torque on the teeth 128 having been removed by release of the clutch E. This is not a synchronous shift except insofar as the shell 138 is synchronized and a slight tooth clash may occur in engaging the shift sleeve teeth G with the teeth 128 of the outer race. Since the pawl shell 138 is floating at this time, no difficulty will be encountered in engaging the teeth 136 of this member with the teeth H of the clutch sleeve F. Upon completion of the forward movement of the clutch sleeve F, the driver will reengage the main clutch E and depress the accelerator pedal 238 to speed up the engine whereupon the vehicle will be driven forwardly in freewheel second speed ratio drive referred to above, through the gear train comprising the shaft 30, pinion 44, gear 50, pinion 56, gear 62, freewheel device J, sleeve F, hub 92, and shaft 12. This is the starting or breakaway drive ratio.

The vehicle may now be accelerated in freewheel second speed ratio drive, the various elements including the pawl carrier 45 being speeded up as the engine speed is increased by further throttle opening movement of the accelerator.

Manifestly, the pawl carrier will rotate at a speed corresponding to that of the runner and at some predetermined speed of these elements, for example 650 to 750 R. P. M. substantially corresponding to a car speed in direct drive between 13.5 to 16 M. P. H. the pawls will overcome the biasing effect of the control springs 194 and will try to move radially outwardly under centrifugal force in an effort to engage the pawl shell 138. However, at this time the pawl shell which is being driven by the gear 62 through the clutch sleeve F is rotating at a slower speed than the drive pinion 44 and pawl carrier 45, such that the pawl pin 208 will engage the driving lug 212 of the balk ring and cause this ring to rotate with the carrier. Under these conditions, the pawl pins 208 and 208A are in engagement with the blocking lands 218, 216 respectively, of the balk ring and the pawls are thus prevented from engaging the shell and from rubbing against the inner surface of the shell. When the driver wishes direct speed ratio drive to be established he merely releases the accelerator pedal which in turn closes the throttle to decelerate the engine, whereupon the runner 24 and the pawl carrier 45 will slow down relative to the pawl shell causing relative movement to take place between the pawl pins and balk ring. When the rotative speeds of the carrier and shell become synchronized and cross each other the pins will move off the lands 218 and 216 and into the recesses 224 and 226 respectively, the friction connection between the shell and balk ring facilitating the same. Engagement of the pawls will take place as soon as the pawls are aligned with the windows on the pawl shell nearest thereto during said relative rotation aforesaid.

Upon depression of the accelerator pedal to again speed up the engine, the transmission of torque will be resumed and direct drive will be established in the transmission, this comprising drive from the shaft 30 through pawl carrier 45, pawl 170, shell 138, clutch sleeve F, hub 92, and shaft 12. This is a two-way drive. It will be understood that engagement of the pawls will be cushioned by the fluid coupling and clutch which will absorb any shock occurring upon making this engagement and minimize any vibration and noise.

With the clutch sleeve F engaged with the clutch teeth 136 in direct drive, the outer race 114 of the freewheel device J will rotate at the speed of the drive pinion 44 which is higher than the speed of the second speed gear 62 and hence will overrun the gear 62.

The pawl clutch will remain engaged and the vehicle will be driven in direct drive until the speed of the pawl carrier 45 falls below a predetermined speed of rotation, for instance, between 500 to 625 R. P. M., for example, corresponding to a car speed of between 10.5 to 12.75 M. P. H. in direct drive whereupon the springs 194 may effect a release of the pawls 170 and hence a release of the direct drive so that second speed ratio drive through the freewheel device J will be resumed automatically upon release of the clutch sleeve F from engagement with the clutch teeth 136 of the drive pinion 44.

In view of this automatic operation, it is possible, for example, for the driver to slow down the vehicle in approaching a stop and downshift from direct drive to freewheel second drive ratio in the process, all without releasing the main clutch E. While standing at a traffic signal, the driver may maintain the transmission in freewheel second drive ratio without substantial creep of the vehicle occurring, the engine idle speed for such operation being insufficient to develop enough torque to overcome the drag load of the vehicle on the runner of the fluid coupling. When the traffic signal changes, the driver need merely depress the accelerator pedal to accelerate the engine and the vehicle will again move forward in freewheel second drive ratio and direct drive may be re-established, as described above, upon release of the accelerator pedal to permit the engine to coast and allow the pawls to unblock and engage.

It is sometimes desirable, for instance, when coasting down a hill in direct drive or freewheel second drive ratio, to obtain engine braking in second speed ratio. With the present transmission this is accomplished by releasing the main clutch E and shifting the clutch sleeve F rearwardly through the neutral position to engage the teeth G of the clutch sleeve with the teeth 64 of the second speed gear 62 to establish two-way second speed ratio drive comprising the shaft 30, pinion 44, gear 50, pinion 56, gear 62, clutch sleeve F, hub 92, shaft 12. In making this shift, the teeth G of the clutch sleeve F will first become disengaged from the teeth 128 of the outer race of the freewheel device J to release the latter member from drive connection with the clutch sleeve. Further rearward movement of the clutch sleeve will cause the faces 91 of the clutch sleeve teeth 68 to abut the faces 81 of the teeth 74 of the blocker ring 72 which under the coast conditions described, rotatably lag behind the clutch sleeve which is drivingly connected to the shaft 12, the faces 91 of such teeth being in position for abutment due to clocking of the ring 72 to limit of the oscillatory movement permitted by lug 73 of the blocker ring which moves to one end of the clocking slot 69 in the clutch sleeve F. The teeth will then be in the position shown in Fig. 14 and it will be observed from this figure that the teeth 66 of the clutch sleeve project beyond the blocker teeth 74 and are in position to enter between the teeth 64 of the gear 62 when the teeth 68 of the clutch sleeve become unblocked.

Continued pressure applied on the blocker synchronizing ring by the shift sleeve will cause the second speed gear to be synchronized through the cone connection P in speed with the driven shaft 12, that is, the second speed gear 62 will be speeded up through the blocker synchronizing action to that of the shaft 12 so that the clutch sleeve teeth 68 may shift by the blocker teeth 74 and the teeth 66 may enter between the teeth 64 of the second speed gear to establish two-way or non-freewheeling second speed ratio drive. As soon as the clutch sleeve becomes engaged to establish the two-way drive, at which time the teeth will assume the position shown in Fig. 15, the main clutch may be engaged and drive of the vehicle in this gear be obtained.

The projection of teeth 66 beyond the teeth 68 in a rearward direction at the time that blocking occurs reduces the rearward movement of the clutch sleeve necessary to complete the drive change thereby enabling the shift sleeve teeth to be made longer than they would otherwise be. Hence, better guiding of the sleeve, freedom from cocking, as well as minimum shifting effort at the manual selector become possible. The complementary one-sided pointing on the teeth 66 and 74 permits a smooth engagement of the sleeve and gear clutching teeth without any clash or dead-ending.

It will be noted from Figures 14 and 15 that as the teeth 68 of the clutch sleeve slip by the blocker teeth 74, the teeth H of the clutch sleeve, the ends of which have single-sided pointing opposite to that of the teeth 66 will move to engage the forward ends of the teeth 128 of the outer race of the freewheel device in a manner to urge the outer race 114 in a releasing direction, that is, counterclockwise in Fig. 8 so as to prevent the freewheel device from becoming locked up in this shift and causing dead-ending of the teeth 66.

Should a shift from freewheel second drive to two-way second drive be desired while the shaft 12 is undergoing drive torque, a similar manipulation of the shift sleeve to that described above will be made following release of the main clutch E.

Should a shift from neutral to two-way second drive be desired a similar rearward manipulation of the shift sleeve to that described above will be made following release of the main clutch E. At this time the blocker ring 72 through its friction engagement at the cone P with the second speed gear 62 will rotatably lead the clutch sleeve such that the faces 90 of the teeth 67 of the clutch sleeve will abut the faces 82 of the blocker teeth 74 of the blocker ring until the speed of the sleeve and second speed gear 62 are synchronized whereupon engagement may be made.

Shift from two-way second speed ratio drive to freewheeling drive in this ratio may be obtained providing the pawls 170 are disengaged, by releasing the accelerator pedal, preferably declutching, to obtain a removal of driving torque on the clutch teeth G, whereupon a forward shift of the clutch sleeve F will disengage these teeth and disengage the sleeve teeth H and teeth 128 of the freewheel outer race which up to this time have been driven at the same speed as the clutch sleeve F and gear 62. The teeth 128 will now be engaged by the sleeve teeth G which are rotating at least as fast as the teeth 128 to effect a freewheel shift and since the pawl shell 138 is at this time floating, no difficulty will be encountered in synchronizing this member with the sleeve though engagement of the faces 103 of the teeth 97 with the faces 150 of the blocker synchronizer teeth 148 (blocker ring 146 being driven by hub 92 through lug 154) and causing the teeth 96 and 97 of the clutch sleeve to successively become engaged with the teeth 136 of the shell.

Figure 12:
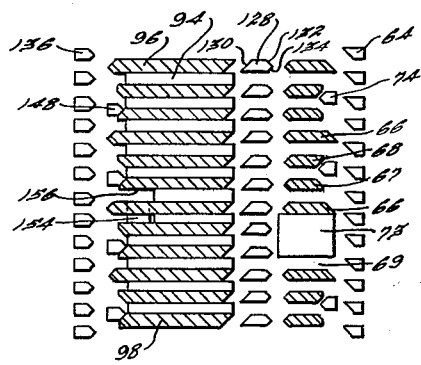
Fig. 12 is a similar view showing the clutch sleeve in blocked position during a shift to direct drive from two-way second ratio drive when the pawls are engaged.

It will be recalled that when shifting from direct drive to two-way second, the pawls 170 remained in engagement with the pawl shell so long as the rotative speed of the pawls and carrier was sufficiently high. This has a distinct advantage in situations where, for example, it is desired to upshift from two-way second to direct while the vehicle is going down hill to obtain engine braking in a lower numerical ratio, it being merely necessary for the driver to release the accelerator pedal, disengage the main clutch E and shift the sleeve F into engagement with the teeth 136 of the shell. In making this shift, no clashing of the teeth will occur because the shift is a synchronized shift. The teeth 148 of the blocker synchronizing ring 146 will rotatably lead the teeth of the clutch sleeve to the extent of the lost motion driving connection provided by the lug 154 between the blocker ring and hub since the shaft 30 is rotating faster than the shaft 12 at the moment of shift. Consequently, the forward end faces 104 of the teeth 96 of the clutch sleeve will, as seen in Fig. 12, abut the faces 152 of the teeth 148 and continued pressure applied through these teeth to the conical surface 142 between the blocker ring and pawl shell will cause the shell to be brought down to the speed of the driven shaft 12 at which time the teeth 98 may pass by the blocker teeth 148 and permit the longer teeth 96 of the sleeve to become engaged with the clutch teeth 136 of the pawl shell to establish two-way direct drive upon subsequent re-engagement of the main clutch E.

Shifts from neutral into low (first speed) or reverse by means of the shiftable gear 232 have already been described, and it is to be noted that in these drives the pawls are generally blocked but if they should engage no damage would result since the shell 136 is then a loose piece. If now it is desired to shift from low to two-way second speed, the main clutch E will be released, the manual selector will be moved through the neutral position to restore the sliding gear 232 to neutral position and clutch sleeve F will then be shifted rearwardly to engage the clutch teeth 64. Since the drive is from a lower to a higher gear, it will be necessary to slow down the second speed gear 62 to the speed of the shaft 12, or stated otherwise, it will be necessary to synchronize the rotative speeds of the shaft 12 and the gear 62. As the sleeve F is shifted rearwardly, the teeth 67 of the clutch sleeve F will have their faces 80 abut the faces 82 of the teeth 74 of the synchronizing ring 72, the clutch sleeve at the time of the shift rotatably lagging the teeth of the synchronizing ring. Continued pressure applied rearwardly by the shift sleeve F will increase the synchronizing pressure at the friction cone P and cause the gear 62 to be slowed down to speed of the hsaft 12. When the parts are synchronized, the teeth 69 will cam off the teeth 74 and immediately the teeth 66 of the sleeve will enter between clutch teeth 64 of the second speed gear thus establishing two-way second speed ratio drive.

Fig. 9 shows a modification of the balk ring structure employed in the arrangement of Figs. 5 and 7 the driving lugs 210 and 212 thereof being moved nearer to the split 207 and being numbered 210ᴬ and 212ᴬ, respectively. The lands 214ᴬ and 218ᴬ corresponding to the lands 214 and 218 respectively of the Fig. 7 arrangement are still located upon the remote side of the driving lug with respect to the ring split 207, and the recesses 224ᴬ and 226ᴬ are directly opposite each other as with the recess 224 and 226 of Fig. 7. However, instead of one of these recesses being located at the split 207, the recesses 224ᴬ and 226ᴬ are respectively, on the remote side of the driving lugs 212ᴬ and 210ᴬ respectively, with respect to the ring split. Moreover, in the modification the pin 208 only may engage the drive lug 212ᴬ and the pin 208ᴬ engages the drive lug 210ᴬ whereas in the Fig. 7 arrangement both driving lugs 210, 212 were engageable by the pin 208 only.

The new arrangement is advantageous in that it facilitates a reduction of possible energization of the balk ring when the pins of the pawls are in driving relation to one or the other of the balk ring driving lugs. It will be observed from Fig. 9 that when driving pressure is applied against a balk ring driving lug by a pawl pin it tends to close in the ring thereby releasing the friction pressure of the ring against the pawl shell 138 whereby the ring may freely rotate with the pawls. As soon as the driving pressure is released as when there is a reversal of driving torque, the balk ring will again expand and its friction with the pawl shell increased to thereby hold the balk ring relative to the shell and permit the engaged pawl pin to move away from the driving lug to effect pawl engagement. With the arrangement in Fig. 7 there is some tendency for the pawl pins when applying pressure against the driving lugs of the balk ring to cause the ring to expand and increase its frictional pressure by servo action with respect to the pawl shell.

Figs. 16 and 17 disclose a modification of the Figs. 5, 10, and 11 arrangement wherein the teeth 96, 97, 98 of the group H of the Fig. 10 sleeve have their rearward ends shortened to form the teeth 96ᴬ, 97ᴬ, and 98ᴬ comprising the group H' all as seen in Fig. 16. Moreover, as seen in Fig. 17 the teeth 128 of the outer race of the freewheel device have been shortened by removing the pointing of these teeth to provide the teeth 128ᴬ. When making shifts with the sleeve F'' between direct drive and two-way second position, the teeth H' will not engage with the teeth 128ᴬ.

Fig. 18 is a modification of the structure of Fig. 5, provision being here made for a double synchronizer element 72ᴬ, the rearward portion of which is similar to that of the synchronizing ring 72 of the Fig. 5 structure, but the forward portion of which is provided with a second set of synchronizing blocking teeth 234 and a second conical surface 236 for engagement with a conical surface 238 formed on the outer race 114ᴬ of the freewheel device. The teeth of the shift sleeve F'' in Fig. 18 are similar to those of the sleeve F' in Figs. 10 and 11. The teeth 128ᴮ of the outer race of the freewheel device are somewhat shorter than the teeth 128 to accommodate the additional synchronizing teeth 234. An expanding ring 240 having friction engagement with the teeth G of the sleeve F'' serves to energize the synchronizing ring 72ᴬ in both forward and rearward movement of the sleeve F'' from its neutral position during which movement the spring 240 is engageable by the side walls of a slot 242 in the ring 72ᴬ which is somewhat wider than the ring 240 to provide a limited amount of lost motion, but insufficient to permit tooth engagement prior to energization of the ring. In making shifts from neutral to freewheel second position the sleeve F'' moves the ring 240 into engagement with the forward wall of the slot 242 to energize the ring 72ᴬ, the outer race of the freewheel device being thus synchronized with respect to the rotative speed of the sleeve so that any clash of the sleeve teeth with the teeth of the outer race of the freewheel device is avoided. The mechanism in Figs. 18 and 19 in all other respects operates similar to that described above with respect to the Fig. 5 structure.

From the above description, it will be seen that I have provided a novel transmission of semi-automatic character particularly useful for low priced cars that has a novel clutching mechanism providing all necessary and desirable driving functions. Although the particular structure shown and described above is well adapted for carrying out the various objects of my invention, it will be understood that various modifications, changes and substitutions may be made without departing from the spirit thereof. The subject invention is, therefore, to be construed to include all such modifications, changes, and substitutions as may come within the scope of the following claims.

I claim:

1. In a variable speed power transmission, a drive shaft, a driven shaft, change speed mechanism for drivingly connecting said shafts, said mechanism comprising centrifugally engageable clutch means for driving the driven shaft at the speed of the drive shaft, means including a one-way coupling device for driving the driven shaft at a slower speed than the drive shaft when said centrifugal means is disengaged, and means for establishing a two-way drive between said drive and driven shaft in said slow speed drive including mechanical control means engageable with said one-way coupling when establishing said two-way drive and operable thereon for neutralizing said one-way coupling.

2. In a variable speed power transmission, coaxial drive and driven shafts, clutching means carried by said shafts for effecting a plurality of different drives between said shafts, including centrifugally operable pawl clutching means for driving the driven shaft at the speed of the drive shaft, one-way drive coupling means including external teeth operable for driving the driven shaft from the drive shaft at a slower speed than the drive shaft, and means operable for driving the driven shaft from the drive shaft in a two-way drive in said slower speed, said last means including toothed control means operably engageable with said external teeth to neutralize said coupling means substantially contemporaneously with establishing said two-way drive.

3. In a variable speed power transmission, a drive shaft; a driven shaft; a first toothed engageable clutching member and a second toothed engageable clutching member, each drivingly connectable to said drive shaft; a third toothed clutching member drivingly connected to said driven shaft and having spaced sets of teeth, said third member being selectively movable to engage one of said sets of its teeth with said first clutching member for obtaining a predetermined speed ratio drive and movable to engage a second of its said sets of teeth with said second member for obtaining a slower speed ration drive than said predetermined drive; a one-way coupling for providing an overrunning drive of the same numerical value as said slow speed drive, said coupling having an annular portion rotatable with said second toothed clutching member, a second annular portion having a set of clutching teeth to be engaged, and an intermediate roller carrier resiliently biased into driving relationship with one of said annular portions; said clutching teeth of said second annular portion being engageable by said second set of teeth of said movable third tooth clutching member for establishing a one-way drive between said shafts and being engageable by said one set of teeth of this movable member upon movement of the latter to engage its said second set of teeth with said second clutching member whereby to actuate said toothed second annular portion in a direction to prevent drive between said annular portions and thereby facilitate engagement of the movable third clutching member and said second clutching member.

4. In a variable speed power transmission, a drive shaft; a driven shaft; a first toothed engageable clutching member and a second toothed engageable clutching member, each drivingly connectable to said drive shaft; a third toothed clutching member drivingly connected to said driven shaft and having spaced sets of teeth, said third member being selectively movable to engage one of its said sets of teeth with said first clutching member for obtaining a predetermined speed ratio drive and movable to engage a second of its said sets of teeth with said second member for obtaining a slower speed ratio drive than said predetermined drive; a one-way coupling for providing an overrunning drive of the same numerical value as said slow speed drive, said coupling having an annular roller cam portion rotatable with said second clutching member, a second annular portion having a set of clutching teeth to be engaged, and an intermediate roller carrier resiliently biased into driving relationship with said cam partion; said clutching teeth of said second annular portion being engageable by said second set of teeth of said movable third toothed clutching member for establishing a one-way drive between said shafts and being engageable by said one set of teeth of this movable member upon movement of the latter to engage its said second set of teeth with said second clutching member whereby to actuate said toothed second annular portion in a direction to prevent drive between said annular portions and thereby facilitate engagement of the movable clutching member and said second clutching member.

5. In a variable speed power transmission, a drive shaft; a driven shaft; a first toothed engageable clutching member and a second toothed engageable clutching member, each drivingly connectable to said drive shaft; a third toothed clutching member drivingly connected to said driven shaft and having spaced sets of teeth, said third member being selectively movable to engage one of its said sets of teeth with said first clutching member for obtaining a predetermined speed ratio drive and movable to engage a second of its said sets of teeth with said second member for obtaining a slower speed ratio drive than said predetermined drive; a one-way coupling for providing an overrunning drive of the same numerical value as said slow speed drive, said coupling having a first annular portion rotatable with said second toothed clutching member, a second annular portion having a set of clutching teeth to be engaged, and an intermediate roller carrier resiliently biased into driving relationship with said first annular portion; said clutch teeth of said second annular portion being engageable by said second set of teeth of said movable third toothed clutching member for establishing a one-way drive between said shafts and being engageable by said one set of teeth of this movable member upon movement of the latter to engage said second toothed clutching member, the adjacent engaging ends of the teeth of said second set of teeth of said movable member and the teeth of said second annular portion being complementarily chamfered substantially the full thickness of the said teeth whereby said second annular portion will be actuated in a direction to prevent drive between said annular portions of said coupling upon engaging movement of said movable clutching member whereby to facilitate engagement of the latter with said second clutching member.

6. In a variable speed power transmission, a drive shaft, a driven shaft, a centrifugal acting pawl carried by said drive shaft, an annular shell having a portion rotatably journalled on said drive shaft, said shell having a set of clutching teeth on said journalled portion and having an opening in its said journalled portion for receiving said pawl when the latter is acted upon by centrifugal force upon rotation of said drive shaft, and a movable clutching member drivingly connected to said driven shaft and having clutching teeth interengageable with the shell clutching teeth for establishing drive between said shafts when said pawl is engaged in said opening.

7. In a variable speed power transmission, a drive shaft; a driven shaft; a floating shell completely carried by said drive shaft and having a portion journalled thereon, said shell having a pawl receiving opening therein in said journalled portion and having a set of clutching teeth; a centrifugal pawl carried by said drive shaft and movably responsive to centrifugal force upon rotation of said drive shaft to engage said opening; a hub member drivingly connected to said driven shaft; a movable clutching member carried by said hub member; clutching teeth on said movable member interengageable with said shell teeth for drivingly connecting said shell and driven shaft; and means for preventing engagement of said pawl and shell when the rotative speeds of said shafts are asynchronous and said movable clutching member is clutched to said shell.

8. In a variable speed power transmission, a drive shaft; a coaxial driven shaft; a floating shell completely carried by said drive shaft and having a portion journalled thereon, said shell having a pawl receiving opening therein in said journalled portion and having a set of clutching teeth; a centrifugal pawl carried by said drive shaft and movably responsive to centrifugal force upon rotation of said drive shaft to engage said opening; a hub member drivingly connected to said driven shaft; a one-way coupling drivingly connected to said drive shaft, said coupling having a toothed output member coaxial with said shell, the teeth of said output member being at the same radial distance from the axis of said shafts as the said clutching teeth of said shell; and a movable aligned clutching member carried by said hub member and having spaced sets of clutching teeth, one of said sets of teeth being interengageable with the shell teeth for drivingly connecting said shafts when said pawl is engaged in said shell opening and the other set being interengageable with the teeth of said toothed output member of said coupling to establish a one-way drive between said shafts pending engagement of said pawl and opening.

9. In a variable speed power transmission, a drive shaft; a driven shaft; a floating shell journalled on said drive shaft, said shell having a pawl receiving opening therein and having a set of clutching teeth; a centrifugal pawl carried by said drive shaft and movably responsive to centrifugal force upon rotation of said drive shaft to engage said opening; a hub member drivingly connected to said driven shaft; a one-way coupling drivingly connected to said drive shaft, said coupling having a toothed output member coaxial with said shell; a movable clutching member carried by said hub member and having spaced sets of clutching teeth, one of said sets of teeth being interengageable with the shell teeth for drivingly connecting said shafts when said pawl is engaged in said shell opening and the other set being interengageable with the teeth of said toothed output member of said coupling to establish a one-way drive between said shafts pending engagement of said pawl and opening; and a balk ring having a frictional drive relationship with said shell operable to prevent engagement of said pawl when the speeds of rotation of said shaft and shell are asynchronous.

10. In a variable speed power transmission, a drive shaft; a driven shaft; a floating shell journalled on said drive shaft, said shell having a pawl receiving opening therein and having a set of clutching teeth; a centrifugal pawl carried by said drive shaft and movably responsive to centrifugal force upon rotation of said drive shaft to engage said opening; a hub member drivingly connected to said driven shaft; a one-way coupling drivingly connected to said drive shaft, said coupling having a toothed output member coaxial with said shell; a movable clutching member carried by said hub member and having spaced sets of clutching teeth, one of said sets of teeth being interengageable with the shell teeth for drivingly connecting said shafts when said pawl is engaged in said shell opening and the other set being interengageable with the teeth of said toothed output member of said coupling to establish a one-way drive between said shafts pending engagement of said pawl and opening; a balk ring operable to prevent engagement of said pawl during asynchronous rotation of said pawl and shell; and means for synchronizing the relative speeds of said shell and movable clutching member.

11. In a variable speed power transmission, a drive shaft, a driven shaft, a plurality of pawls carried by said drive shaft and movable outwardly under centrifugal action in response to predetermined speed of rotation of said drive shaft, control means for governing the outward movement of said pawls, a floating pawl engaging shell completely carried by said drive shaft and having a portion journalled thereon, said shell having a plurality of uniformly spaced pawl receiving windows in said journalled portion, the number of said windows constituting a multiple of the number of pawls, and means for drivingly connecting said shell and driven shaft.

12. In a variable speed power transmission, a drive shaft; a driven shaft; a centrifugal pawl carried by said drive shaft; a floating pawl engaging shell journalled on said drive shaft, said shell having a pawl receiving window and having a set of clutching teeth; a synchronizing ring journalled on said shell, said ring having a set of blocking teeth; a hub member rotatable with said driven shaft; a movable clutch sleeve carried by said hub member, said sleeve having long teeth for engagement with said shell teeth and having shorter teeth set back from said long teeth; said blocker teeth and said shorter sleeve teeth having complementary chamfered faces adapted for engagement when said sleeve is moved to engage said shell teeth and the engaging ends of said long teeth projecting between said blocker teeth and short of engagement with said shell teeth when said chamfered faces of said short sleeve teeth and said blocker teeth are engaged.

13. In a variable speed power transmission, coaxial drive and driven shafts; a toothed clutch member carried on and adapted for drive connection with said drive shaft; a second toothed clutch member drivingly connected with said drive shaft and journalled on said driven shaft;

an axially shiftable clutch sleeve supported by said driven shaft intermediate said clutch members, said sleeve having axially spaced sets of clutch teeth, each set comprising relatively long teeth and circumferentially intermediate relatively short teeth set back axially from said long teeth, said sleeve having a neutral position disengaged from said clutch members and being selectively shiftable to engage its long teeth with the teeth of said clutch members; a synchronizing ring journalled on each of said clutch members, said rings having teeth positioned intermediate the teeth of said clutch members and sleeves and between pairs of said long teeth in the neutral position of said sleeve and adapted to be engaged by said short teeth before the clutch members may be engaged by said long teeth; the amount of set back of said short teeth being such that said long teeth will be in position to engage the teeth of said clutch members when said teeth of said rings may pass between said short teeth of said sleeve.

14. In a variable speed power transmission, coaxial drive and driven shafts; a first toothed clutch member journalled on said drive shaft; means for drivingly connecting said clutch member and drive shaft; a second toothed clutch member journalled on said driven shaft and drivingly connected with said drive shaft; a hub member drivingly connected to said driven shaft and positioned intermediate said first and second clutch members; a clutch sleeve non-rotatably supported by said hub member and adapted for axial movement relative thereto; a one-way coupling having an inner member drivingly connected with said second clutch member and having an outer member provided with clutching teeth intermediate said hub member and said second clutch member; a first toothed synchronizing ring journalled on said first clutch member and arranged for limited oscillatory movement relative to said hub, the teeth of said ring being positioned axially intermediate the teeth of said first clutch member and said hub member; and a second toothed synchronizing ring journalled on said second clutch member and arranged for limited oscillatory movement relative to said sleeve, the teeth of said second ring being positioned axially intermediate the teeth of said second clutch member and said hub member; said clutch sleeve having a first set of teeth including relatively long teeth for engaging the teeth of said first clutch member upon movement of said sleeve to effect said engagement, and said first set of teeth including relatively short teeth set back axially inwardly from said long teeth for engagement with said first ring teeth before said long teeth engage the teeth of said first clutch member and said sleeve having a second set of teeth including relatively long teeth for engaging the teeth of said second clutch member upon movement of said sleeve to effect said engagement and adapted to engage the teeth of said outer coupling member upon movement of said sleeve in the direction of said first clutch member and said second set of teeth including relatively short teeth set back axially inwardly from said long teeth thereof for engagement with said second ring teeth before said long teeth engage said teeth of said second clutch member.

15. In a variable speed power transmission, coaxial drive and driven shafts; a first toothed clutch member journalled on said drive shaft; means for drivingly connecting said clutch member and drive shaft; a second toothed clutch member journalled on said driven shaft and drivingly connected with said drive shaft; a hub member drivingly connected to said driven shaft and positioned intermediate said first and second clutch members; a clutch sleeve non-rotatably supported by said hub member and adapted for axial movement relative thereto; a one-way coupling having an inner member drivingly connected with said second clutch member and having an outer member provided with clutching teeth intermediate said hub member and said second clutch member; a first toothed synchronizing ring journalled on said first clutch member and arranged for limited oscillatory movement relative to said hub, the teeth of said ring being positioned axially intermediate the teeth of said first clutch member and said hub member; and a second toothed synchronizing ring journalled on said second clutch member and arranged for limited oscillatory movement relative to said sleeve, the teeth of said second ring being positioned axially intermediate the teeth of said second clutch member and said hub member; said clutch sleeve having a first set of teeth including relatively long teeth for engaging the teeth of said first clutch member upon movement of said sleeve to effect said engagement and adapted to engage the teeth of said outer coupling member upon movement of said sleeve in the direction of said second clutch member and said first set of teeth including relatively short teeth set back axially inwardly from said long teeth for engagement with said first ring teeth before said long teeth engage the teeth of said first clutch member and said sleeve having a second set of teeth including relatively long teeth for engaging the teeth of said second clutch member upon movement of said sleeve to effect said engagement and adapted to engage the teeth of said outer coupling member upon movement of said sleeve in the direction of said first clutch member and said second set of teeth including relatively short teeth set back axially inwardly from said long teeth thereof for engagement with said second ring teeth before said long teeth engage said teeth of said second clutch member.

16. A variable speed power transmission as claimed in claim 14, wherein the means for drivingly connecting said first toothed clutching member and said drive shaft comprises a centrifugal acting pawl carried by said drive shaft and a pawl receiving opening in said first clutching member.

17. A variable speed power transmission as claimed in claim 14, wherein the means for drivingly connecting said first toothed clutching member and said drive shaft comprises a centrifugal acting pawl carried by said drive shaft for rotation therewith, a pawl receiving slot window in said first clutching member for receiving said pawl and a balk ring frictionally connected to one of said clutch members and hub member for controlling engagement of said pawl in said window.

18. A variable speed power transmission as claimed in claim 14, wherein all the teeth recited therein are of the same diametral pitch and pitch diameter and wherein all the interengaging ends of the teeth are pointed by chamfered faces, the interengaging ends of the first set of sleeve teeth and the outer coupling member teeth and said second set of sleeve teeth and said second clutching member teeth having complementary single chamfers extending between the side faces of the teeth.

19. A variable speed power transmission as claimed in claim 14, wherein the second toothed synchronizing ring has two sets of axially spaced teeth for engagement by the short teeth of the second set of sleeve teeth.

20. A variable speed power transmission as claimed in claim 14, wherein the second toothed synchronizing ring has two sets of axially spaced teeth for engagement by the short teeth of the second set of sleeve teeth, and a spring drag ring carried by said synchronizing ring and frictionally engaging said sleeve for energizing said ring in either direction of movement of said sleeve.

21. Transmission mechanism comprising drive and driven shafts; means for drivingly connecting said shafts, including a pair of relatively rotatable structures at least one of which is adapted for rotational change from one direction to the opposite direction relative to any point on the other of said structures; one of said structures including a pawl carrying core drivingly connected to said drive shaft, a pawl adapted to be projected from a disengaging position to an engaging position; the other of said structures including a shell having a portion journalled on said core, means for clutching said shell to said driven shaft, an opening in said shell journalled portion adapted to be engaged by said pawl when the same is projected into engaging position to lock said structures together against relative rotation; and a latching element supported by said shell and engaging the said one structure; said element preventing the pawl from projection into engaging position during asynchronous rotation of the said structures under drive and coast conditions of operation of said other structure and being movable to release the pawl for projection into engaging position in response to a change in direction of relative rotation of said structures.

22. Transmission mechanism comprising drive and driven shafts; means for drivingly connecting said shafts including a pair of relatively rotatable structures at least one of which is adapted for rotational change from one direction to the opposite direction relative to any point on the other of said structures; one of said structures carrying a pawl adapted to be projected from a disengaging position into an engaging position; a projection on said pawl; the other of said structures having a shell with a plurality of slots adapted to be engaged by said pawl when the same is projected into engaging position to lock said structures together against relative rotation; a ring interposed between said structures, said ring having a lug engageable by said pawl projection for driving said ring; a land adjacent said lug for engaging said pawl projection to prevent projection of said pawl into engaging position; and a recess adjacent said land for receiving said pawl projection when the pawl is projected into engaging position; said ring being rotatably movable by frictional engagement with said other structure to move the said lug out of engagement with the pawl projection and to move said recess into alignment with said pawl projection in response to a relative directional change of rotation of said structures to permit said pawl to enter a slot in said shell and lock the structures together against relative rotation; said recess extending through an angle measured between common points on said pawl projection sufficient to permit reception of said pawl projection and at least corresponding to the angular distance between common points on adjacent slots of said shell.

23. Transmission mechanism comprising drive and driven shafts; means for drivingly connecting said shafts including a pair of relatively rotatable structures at least one of which is adapted for rotational change from one direction to the opposite direction relative to any point on the other of said structures; one of said structures carrying diametrically oppositely positioned pawls adapted to be projected from a disengaging position into an engaging position and there being a projection on each of said pawls; the other of said structures having a shell with a plurality of uniformly spaced pawl receiving windows adapted for engagement by said pawls when the latter are projected into engaging position to lock said structures together against relative rotation; a ring interposed between said structures, said ring having a pair of lugs, one engageable by the pawl projection of one of said pawls for driving said ring, the other engageable by the pawl projection of the other of said pawls for holding said ring from relative rotation with respect to said one structure; a first land adjacent said driving lug for engaging the projection of the pawl in engagement with said lug for preventing projection of said pawl into engaging position; a second similar land adjacent said holding lug; a third land diametrically opposite said first land for preventing projection of the pawl opposite that engaged with said first land into engaging position; a fourth similar land opposite said second land for preventing projection of the pawl opposite that engaged with said second land into engaging position; a recess between said first and fourth land and between said second and third lands for receiving said pawl projections when the pawls are projected into engaging position; said ring having a frictional driving relationship with said other structure whereby to effect relative movement between the lugs and pawl projections to release engagement thereof in response to a relative change of rotation between said structures and to facilitate alignment of the recesses with the pawl projections to permit said pawls to enter a pair of windows in said shell and lock the structures together against relative rotation.

24. Transmission mechanism as claimed in claim 23, wherein the length of the recesses measured circumferentially of the ring is at least the distance between two succeeding windows measured between similar points on said windows and on the same radius as the recesses, plus the circumferential width of said pawl projection.

25. Transmission mechanism as claimed in claim 23, wherein the friction ring is a split ring and wherein the lugs are less than ninety degrees of arc from the split in the ring.

26. Transmission mechanism comprising drive and driven shafts; means for drivingly connecting said shafts including a pair of relatively rotatable structures at least one of which is adapted for rotational change from one direction to the opposite direction relative to any point on the other of said structures; one of said structures carrying diametrically oppositely positioned pawls adapted to be projected from a disengaging position into an engaging position and there being a projection on each of said pawls; the other of said structures having a shell with a plurality of uniformly spaced pawl receiving windows adapted for engagement by said pawls when the latter are projected into engaging position to lock said structures together against relative rotation; a ring interposed between said structures, said ring having a pair of lugs, one engageable by the pawl projection of one of said pawls for driving said ring, the other engageable by the same pawl projection for holding said ring from relative rotation with respect to said one structure; a first land adjacent said driving lug for engaging the projection of the pawl in engagement with said lug for preventing projection of said pawl into engaging position; a second similar land adjacent said holding lug; a third land diametrically opposite said first land for preventing projection of the pawl opposite that engaged with said first land into engaging position; a fourth similar land opposite said second land for preventing projection of the pawl opposite that engaged with said second land into engaging position; a recess between said first and second lands and between said third and fourth lands for receiving said pawl projections when the pawls are projected into engaging position; said ring having a frictional driving relationship with said other structure whereby to effect relative movement between the lugs and pawl projections to release engagement thereof in response to a relative change of rotation between said structures and to facilitate alignment of the recesses with the pawl projections to permit said pawls to enter a pair of windows in said shell and lock the structures together against relative rotation.

27. Transmission mechanism as claimed in claim 26, wherein the friction ring is a split ring and the split is located intermediate said third and fourth lands.

28. Transmission mechanism as claimed in claim 26, wherein the length of the recesses measured circumferentially of the ring is at least the distance between two succeeding windows measured between similar points on said windows and on the same radius as the recesses plus the circumferential width of a pawl projection.

29. In a transmission mechanism having a centrifugal pawl clutch including a shell having a plurality of uniformly spaced slots, a pawl adapted to be projected into engagement with one of said slots and a pin carried by said pawl; a balk ring for blocking engagement of the pawl until the rotational speeds of the pawl and shell are synchronized, said ring having a lug for drive engagement with said pin, a land adjacent said lug for blocking engagement of said pawl, said land intersecting said lug to form a corner recess the radius of which is less than the radius of said pin, and a further recess adjacent said land into which the pin may be received when said pawl is projected into engagement with said shell, said further recess having a circumferential extent at least equal to the distance between similar points on adjacent slots of said shell measured on the same radius, plus the diameter of said pin.

30. Transmission mechanism comprising drive and driven shafts; means for drivingly connecting said shafts including a pair of relatively rotatable structures at least one of which is adapted for rotational change for one direction to the opposite direction relative to any point on the other of said structures; one of said structures carrying a pawl adapted to be projected from a disengaging position into an engaging position; a pin on said pawl; the other of said structures having a shell with a slot adapted to be engaged by said pawl when the same is projected into engaging position to lock said structures together against relative rotation; a ring interposed between said structures, said ring having a lug engageable by said pin for driving said ring; a land adjacent said lug for engaging said pin to prevent projection of said pawl into engaging position, said land intersecting said lug to form a corner recess the radius of which is less than that of said pin; and a further recess adjacent said land for receiving said pin when the pawl is projected into engaging position; said ring being rotatably movable by frictional engagement with said other structure to move the said lug out of engagement with the said pin and to move said further recess into alignment with said pawl pin in response to a relative directional change of rotation of said structure to permit said pawl to enter the slot in said shell and lock the structures together against relative rotation.

31. In a variable speed power transmission, coaxial drive and driven shafts; a hub member rotatable with said driven shaft; an axially movable clutch sleeve non-rotatably carried by said hub member; a toothed clutching member drivingly connected to said drive shaft and rotatably journalled on said driven shaft; a one-way coupling drivingly connected to said clutching member and including a plurality of clutching teeth; a set of clutching teeth on said clutch sleeve selectively engageable by axial movement of said sleeve with said toothed clutching member to establish a two-way driving connection between said shafts or with said clutching teeth of said one-way coupling to establish a one-way driving connection between said shafts; said clutching teeth of said one-way coupling having one of their ends shaped with a chamfer and there being a further set of teeth on said sleeve, the teeth of which have a shaped end substantially complementary to the said chamfered end of said coupling teeth and which confront said chamfered end of said coupling teeth when said first mentioned set of sleeve clutching teeth is disengaged from said coupling teeth and said toothed clutching member; said complementary shaped ends of said sleeve teeth and coupling teeth being engageable to actuate said one-way coupling in a releasing direction when moving said clutch sleeve to establish said two-way drive.

32. In a variable speed power transmission, a drive shaft, a driven shaft, a floating shell member completely carried by the drive shaft and having a portion journaled thereon, said shell member being normally freely rotatable in either direction of rotation relative to said drive shaft, centrifugal pawl means for drivingly clutching said journalled portion of said shell member and said drive shaft, and jaw clutch means for drivingly clutching said shell member and said driven shaft.

ROBERT W. WOLFE.

References Cited in the file of this patent

UNITED STATES PATENTS

| Number | Name | Date |
| --- | --- | --- |
| 2,134,316 | Rauen et al. | Oct. 25, 1938 |
| 2,159,430 | Dunn | May 23, 1939 |
| 2,160,091 | Simpson et al. | May 30, 1939 |
| 2,170,926 | Keller | Aug. 29, 1939 |
| 2,179,927 | Fishburn | Nov. 14, 1939 |
| 2,194,787 | Dunn | Mar. 26, 1940 |
| 2,259,527 | Manville | Oct. 21, 1941 |
| 2,278,623 | Orr | Apr. 7, 1942 |
| 2,343,312 | Maurer | Mar. 7, 1944 |
| 2,448,539 | Maurer | Sept. 7, 1948 |